United States Patent
Sagawa et al.

(10) Patent No.: US 10,692,711 B2
(45) Date of Patent: Jun. 23, 2020

(54) ION SOURCE ADAPTER

(71) Applicant: HUMAN METABOLOME TECHNOLOGIES, INC., Tsuruoka-shi, Yamagata (JP)

(72) Inventors: Hitoshi Sagawa, Tsuruoka (JP); Kazunori Sasaki, Tsuruoka (JP)

(73) Assignee: HUMAN METABOLOME TECHNOLOGIES, INC., Tsuruoka (JP)

( * ) Notice: Subject to any disclaimer, the term of this patent is extended or adjusted under 35 U.S.C. 154(b) by 0 days.

(21) Appl. No.: 16/335,182

(22) PCT Filed: Mar. 24, 2017

(86) PCT No.: PCT/JP2017/012095
§ 371 (c)(1),
(2) Date: Mar. 20, 2019

(87) PCT Pub. No.: WO2018/055815
PCT Pub. Date: Mar. 29, 2018

(65) Prior Publication Data
US 2019/0279854 A1    Sep. 12, 2019

(30) Foreign Application Priority Data

Sep. 21, 2016   (JP) .................................. 2016-184802

(51) Int. Cl.
*H01J 49/10* (2006.01)
*G01N 27/62* (2006.01)
*H01J 49/04* (2006.01)

(52) U.S. Cl.
CPC .............. *H01J 49/10* (2013.01); *G01N 27/62* (2013.01); *H01J 49/045* (2013.01)

(58) Field of Classification Search
None
See application file for complete search history.

(56) References Cited

U.S. PATENT DOCUMENTS

| 5,157,260 A | 10/1992 | Mylchreest et al. |
| 5,877,495 A | 3/1999 | Takada et al. |
| (Continued) | | |

FOREIGN PATENT DOCUMENTS

| JP | H06-215726 A | 8/1994 |
| JP | H08-54370 A | 2/1996 |
| (Continued) | | |

OTHER PUBLICATIONS

Fenn, J. B. et al.; "Electrospray Ionization for Mass Spectrometry of Large Biomolecules"; Science 246 (4926); Oct. 3, 1989; pp. 64-71.
(Continued)

*Primary Examiner* — Andrew Smyth
(74) *Attorney, Agent, or Firm* — Oliff PLC

(57) ABSTRACT

An ion source adapter configured to enable a mass spectrometer, used with a voltage applied to a nebulizer side of an ion source configured to generate an ion, to be used with the nebulizer side grounded, the ion source adapter comprising a tube inserted between an ion introduction port of a capillary of the mass spectrometer and the nebulizer, the tube being formed of an insulator and allowing ions to pass through an interior thereof; a fixing tool configured to align and fix a mass spectrometer side of the tube and the ion introduction port of the capillary; and an electrode configured to apply a voltage to a nebulizer side of the tube, wherein outer peripheries of the nebulizer side and/or the mass spectrometer side of the tube are coated with a conductor, and are used for electric conduction.

8 Claims, 7 Drawing Sheets

(56) References Cited

U.S. PATENT DOCUMENTS

| | | |
|---|---|---|
| RE36,892 E | 10/2000 | Apffel, Jr. et al. |
| 2004/0099803 A1* | 5/2004 | Tong ............... H01J 49/10 250/288 |
| 2005/0072934 A1 | 4/2005 | Frazer et al. |
| 2006/0145071 A1 | 7/2006 | Frazer et al. |
| 2007/0023677 A1 | 2/2007 | Perkins et al. |
| 2011/0240844 A1 | 10/2011 | Ouyang et al. |
| 2012/0292526 A1 | 11/2012 | Hiraoka et al. |
| 2012/0298860 A1* | 11/2012 | Park ............... H01J 49/0404 250/288 |
| 2013/0126723 A1 | 5/2013 | Ouyang et al. |
| 2013/0292564 A1 | 11/2013 | Ouyang et al. |
| 2014/0158882 A1 | 6/2014 | Ouyang et al. |
| 2015/0014525 A1 | 1/2015 | Ouyang et al. |
| 2015/0262803 A1 | 9/2015 | Ouyang et al. |
| 2016/0118237 A1 | 4/2016 | Ouyang et al. |
| 2017/0154761 A1 | 6/2017 | Ouyang et al. |
| 2018/0286651 A1 | 10/2018 | Ouyang et al. |

FOREIGN PATENT DOCUMENTS

| | | |
|---|---|---|
| JP | H08-54372 A | 2/1996 |
| JP | H11-118764 A | 4/1999 |
| JP | 2000-55898 A | 2/2000 |
| JP | 2007-10667 A | 1/2007 |
| JP | 2012-505519 A | 3/2012 |
| WO | 2010/045049 A1 | 4/2010 |
| WO | 2011/099642 A1 | 8/2011 |

OTHER PUBLICATIONS

Jun. 27, 2017 International Search Report issued in International Patent Application PCT/JP2017/012095.

* cited by examiner

MASS SPECTRA OF ISOLEUCINE

ION SOURCE ADAPTER

TECHNICAL FIELD

The present invention relates to ion source adapters, separation analysis devices, and separation analysis methods. In particular, the present invention relates to an ion source adapter suitably used for ionization in capillary electrophoresis-mass analysis, the ion source adapter enabling a mass spectrometer (MS), including an electrospray ion source originally used with a voltage applied to a nebulizer side, to be used as an MS including an electrospray ion source with the nebulizer side grounded. The present invention also relates to a separation analysis device and a separation analysis method using the ion source adapter.

BACKGROUND ART

Atmospheric pressure ionization (API) used for taking out a target component as an ion in a gas phase includes electro-spray ionization (ESI) that generates ions in the process of spraying a solution containing ions into an electric field and volatilizing droplets of the solution. The ESI is broadly utilized as the interface for introducing to the MS the liquid separated by a separation analyzer, such as capillary electrophoresis (CE), liquid chromatography (LC), and ion chromatography (IC) devices (see Non Patent Literature 1).

As illustrated in FIG. 1, the ESI is to spray into an ion source 10 a liquid flow that is introduced from a capillary 8 of the separation analyzer into a nebulizer 12 of the ion source 10 to generate ions 18, and to introduce the ions 18 to a capillary 22 of an MS 20. That is, the sample solution is introduced to the capillary 8 of the ion source 10, and with an electric field applied to the sample solution, the nebulizer 12 feeds and sprays an atomized gas (also called nebulizer gas) from the outside of the capillary 8 to form fine charged droplets. As the charged droplets move, evaporation of solvent and increase in the surface electric field of the charged droplets progress. When the repulsive force between electric charges surpasses the surface tension of the charged droplets, the charged droplets are split. Through repeated evaporation and split, the charged droplets become fine droplets. In the end, the droplets are discharged into the gas phase as sample ions 18 (ion evaporation).

The electric field is generated by forming an electric potential difference between the nebulizer 12 and an ion introduction port of the capillary (inlet port 22A of the capillary 22) of the MS 20. Depending on the manufacturers, some MSs are configured such that the nebulizer side of the electrospray ion source is grounded (Patent Literature 1), while other MSs are configured such that a voltage is applied to the nebulizer side (Non Patent Literature 1).

CITATION LIST

Patent Literature

Patent Literature 1: Japanese Patent Application Laid-Open No. Hei. 8-54372

Non-Patent Literature

Non-Patent Literature 1: Fenn, J. B. et al., "Electrospray Ionization for Mass Spectrometry of Large Biomolecules". Science 246 (4926), Oct. 6, 1989, pp 64-71

SUMMARY OF INVENTION

Technical Problem

In the case of connecting a CE device and an electrospray ion source in particular, separation conditions of CE and operating conditions of MS can be set independently. Accordingly, it is desirable to ground the nebulizer side.

However, most of the MS manufacturers offer the electrospray ion sources configured to be used with a voltage applied to the nebulizer side, which hinders grounding on the nebulizer side.

The present invention has been made to solve the conventional problem, and it is an object of the present invention to enable an existing MS, including an electrospray ion source originally used with a voltage applied to the nebulizer side, to be used as an MS including an electrospray ion source with the nebulizer side grounded through use of an adapter.

Solution to Problem

To accomplish the aforementioned object, the present invention provides an ion source adapter configured to enable an MS, used with a voltage applied to a nebulizer side of an electrospray ion source, to be used with the nebulizer side grounded, the ion source adapter including: a tube inserted between an ion introduction port of a capillary of the MS and the nebulizer, the tube being formed of an insulator and allowing ions to pass through an interior thereof; a fixing tool configured to align and fix an MS side of the tube and the ion introduction port of the capillary; and an electrode configured to apply a voltage to a nebulizer side of the tube. Outer peripheries of the nebulizer side and/or the mass spectrometer side of the tube are coated with a conductor, and are used for electric conduction.

Here, the tube may be made of a glass material, a plastic material, or a ceramic material.

The outer peripheries of both the nebulizer side and the mass spectrometer side of the tube may be coated with conductive materials that are separated from each other.

The ion source adapter may include a heater configured to heat the nebulizer side of the tube to promote ionization.

The present invention provides a separation analysis device configured by combining separation analysis and mass analysis, the separation analysis device including the ion source adapter.

The present invention provides a separation analysis method using the separation analysis device.

Advantageous Effects of Invention

The present invention enables an existing MS, including an electrospray ion source originally used with a voltage applied to the nebulizer side, to be used as an MS including an electrospray ion source with the nebulizer side grounded through the use of the adapter. Therefore, the existing MS can independently set the separating conditions of the separation analyzer, such as a CE device, and the operating conditions of the MS.

DESCRIPTION OF EMBODIMENTS

Hereinafter, embodiments of the present invention will be described in details with reference to the drawings. The present invention is not limited to the contents provided in the following embodiments and examples. The constituent features in the embodiments and examples described below include features easily assumed by those skilled in the art, features substantially identical, and features within so-called the range of equivalency. The component members disclosed in the embodiments and the examples below may properly be combined, and may properly be selected and used.

Figure 1:
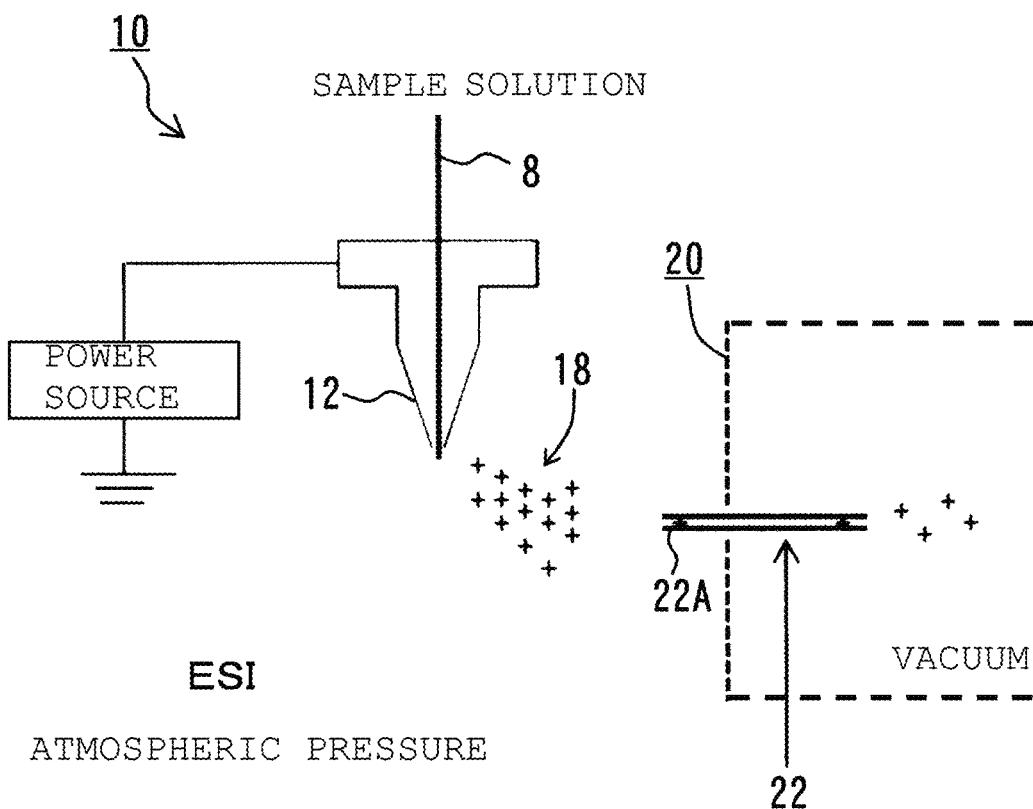
FIG. 1 is a cross-sectional view illustrating a relationship between a conventional ion source and a mass spectrometer.
Figure 2:
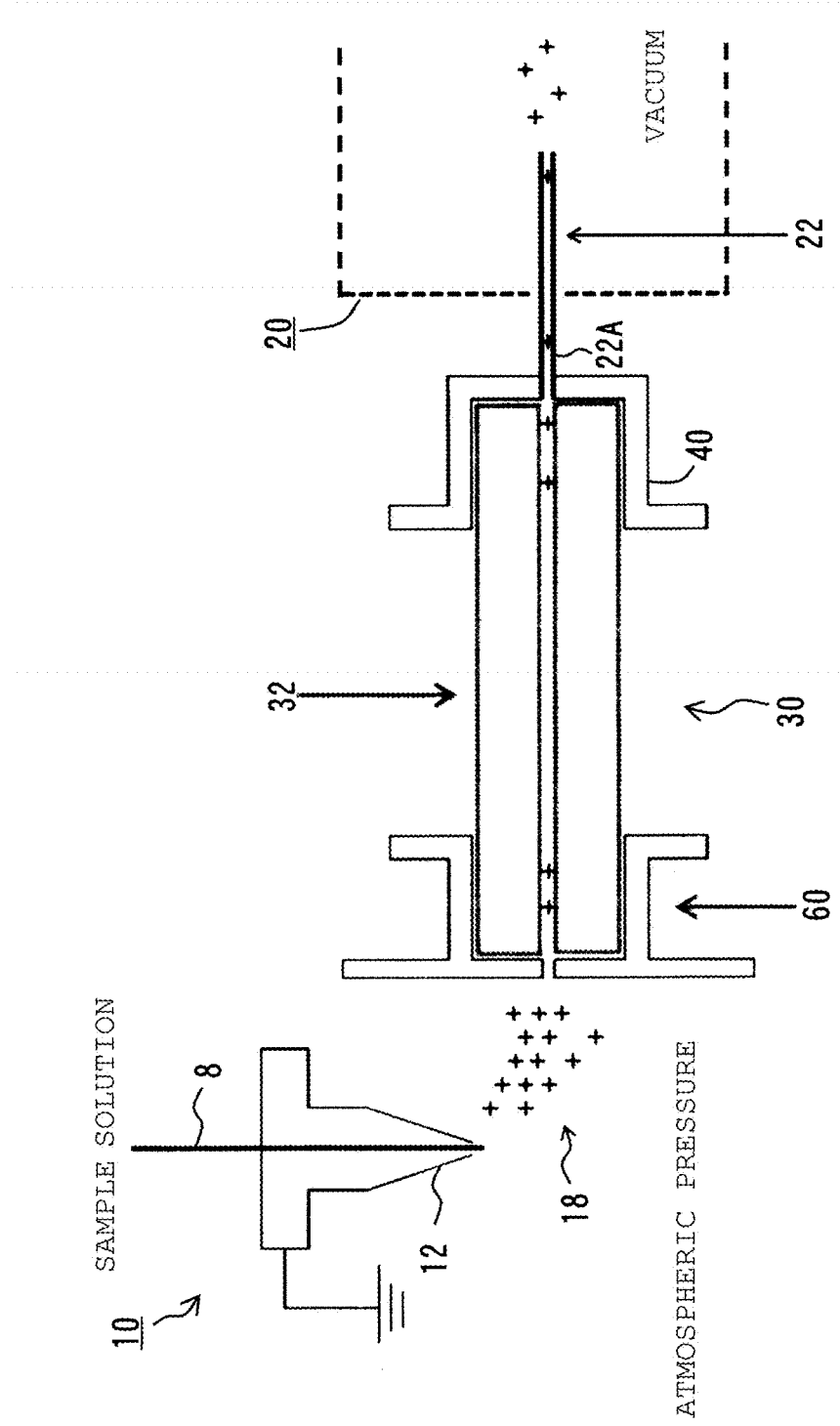
FIG. 2 is a cross-sectional view illustrating a configuration of a first embodiment according to the present invention.

As illustrated in FIG. 2, in a first embodiment representing the basic configuration of the present invention, an ion source adapter 30 is inserted and placed between an ion source 10 having a nebulizer 12 similar to that of a conventional example illustrated in FIG. 1 and an MS 20 having a capillary 22. As illustrated in FIG. 2, the ion source adapter 30 includes a tube 32 allowing ions to pass through the interior thereof, a fixing tool 40 for aligning and fixing the MS 20 side of the tube 32 and an ion introduction port 22A of the capillary 22, and an electrode 60 for applying a voltage to the nebulizer 12 side of the tube 32.

As the tube 32, a glass tube with an inner diameter same as that of the capillary 22 of the MS 20 may be used. For example, the inner diameter thereof may be 0.1 mm to 1.0 mm. Without being limited to glass, the material of the tube 32 may be plastic and ceramics.

The voltage applied to the electrode 60 may be set to, for example, −6000 to −1000 V in a cation mode, and may be set to, for example, +1000 to +6000 V in an anion mode.

According to such a configuration, the ion source adapter 30 is placed on the inlet side of the MS 20 including an electrospray ion source originally used with a voltage applied to the nebulizer side. Accordingly, in the state where the nebulizer side is grounded, electrospray can be performed to generate ions 18, and the generated ions 18 can be taken into the capillary 22 of the MS 20.

Next, a second embodiment will be described as a specific example of the present invention with reference to FIG. 3.

In the second embodiment, the capillary 22 of the MS 20 is a metal tube.

Conductive coatings 32a and 32b made of metal, such as platinum or nickel, are applied to the vicinity of both the ends of the tube 32.

The fixing tool 40 includes a U-shaped metal receiving port 42 at the end (right end in the drawing) of the tube 32 on the MS 20 side. The receiving port 42 is fixed to the capillary 22 by welding. The fixing tool 40 also includes a pressing plate 50 for fixing the end (right end in the drawing) of the tube 32 into the receiving port 42 through an O-ring 48.

The O-ring 48 is used to maintain the interior of the MS 20 in vacuum with respect to the atmospheric pressure provided around the tube 32. In the case where the receiving port 42 and the conductive coating 32a on the outer periphery of the tube 32 are bonded by welding or other means, the O-ring 48 and the pressing plate 50 can be omitted.

The capillary 22 of the MS 20 and the receiving port 42 of the tube 32 are maintained at the same electric potential by the conductive coating 32a on the outer periphery of the tube 32.

Provided on the nebulizer 12 side of the tube 32 is the electrode 60 including a first electrode and a second electrode. The first electrode includes an electrode 62 and a metal cap 64. The second electrode includes a metal support stand 66, a metal cap 68, a metal support bar 70, and a metal plate 72.

The electrode 62 is electrically connected with the metal cap 64 through the conductive coating 32b on the outer periphery of the tube 32.

A voltage 2 with an absolute value smaller than a voltage 1 of the first electrode is applied to the second electrode. Due to this, an electric potential difference is generated in the space of the ion source 10 where the atomized gas is sprayed from the distal end of the capillary 8 by the nebulizer 12. Then, the ions are sucked from the second electrode into the first electrode. The ions are sucked, together with the gas under the atmospheric pressure, into the tube 32 and subsequent members due to a difference between the atmospheric pressure and vacuum. The second electrode can be omitted.

Provided on the nebulizer 12 side of the tube 32 is a heater 80 for promoting ionization, the heater 80 being equivalent to the heater conventionally integrated with the MS 20.

Figure 3:
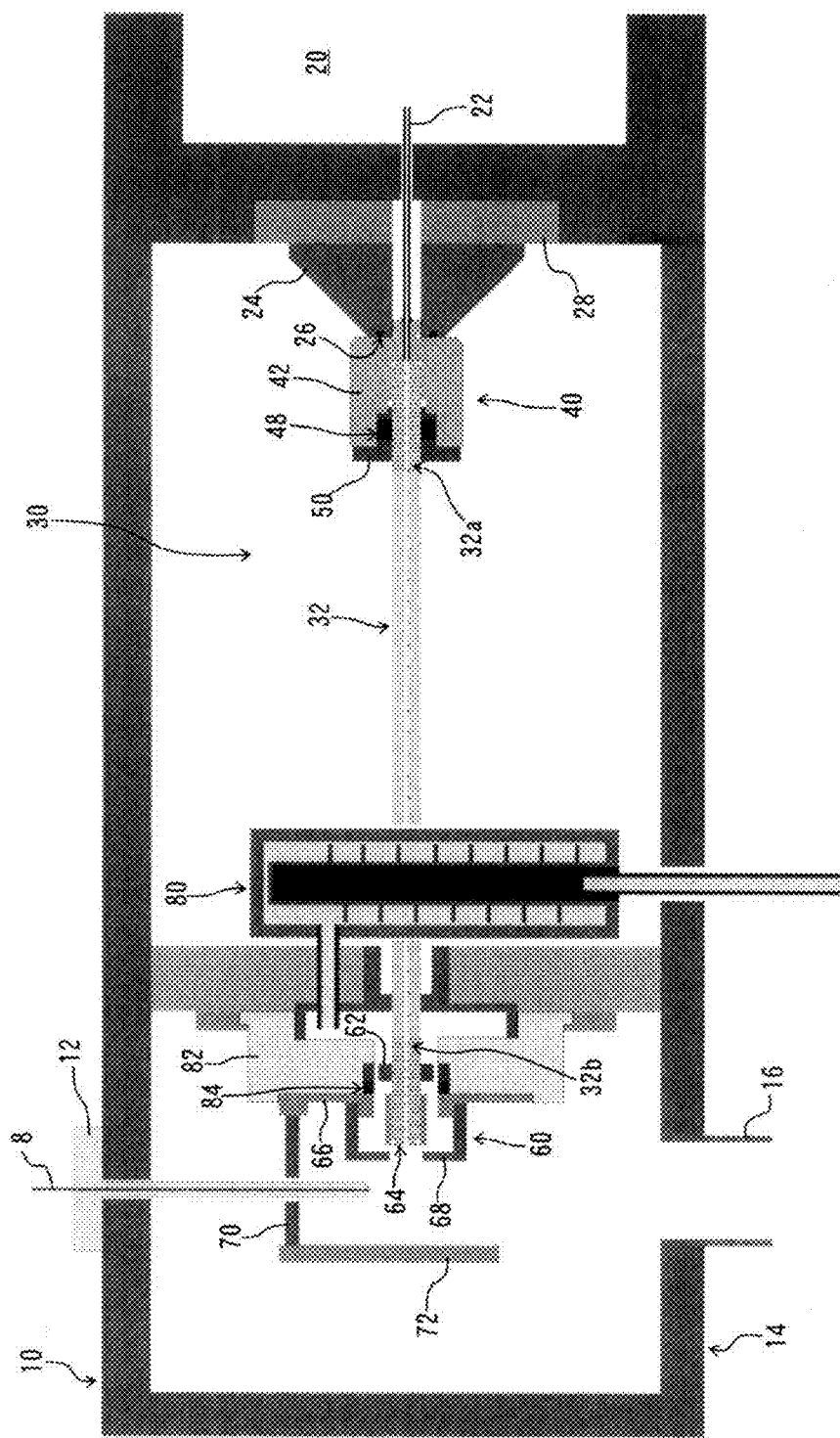
FIG. 3 is a cross-sectional view illustrating a configuration of a second embodiment according to the present invention.

Illustrated in FIG. 3 are a metal casing 14 to ground the nebulizer 12, an exhaust port 16 of the metal casing 14, a metal fixing tool 24 on the side of the MS 20 for fixing the fixing tool 40, an O-ring 26 for maintaining the interior of the MS 20 in vacuum in the state where the fixing tool 40 is connected to the metal fixing tool 24, a plastic spacer 28, a plastic support stand 82, and a plastic spacer 84. The metal casing 14 is maintained at ground potential.

The metal fixing tool 24 can also be used as an electrode that applies a voltage from the MS 20 to the capillary 22 through the fixing tool 40.

As the plastic, a fluorocarbon resin or a polyether ether ketone (PEEK) resin can be used. As the metal, stainless steel can be used, for example.

Since the heater 80 is provided in the present embodiment, ionization can be promoted.

Since the outer periphery of the tube 32 is coated with the conductive materials 32a and 32b, the outer periphery can be used for electric conduction. This makes it possible to simplify the configuration.

The tube 32 may have a length adjusted and optimized. The tube 32 may also have an inner diameter and an outer diameter variable in accordance with the tube diameter of the capillary 22 on the MS 20 side.

Figure 4A:
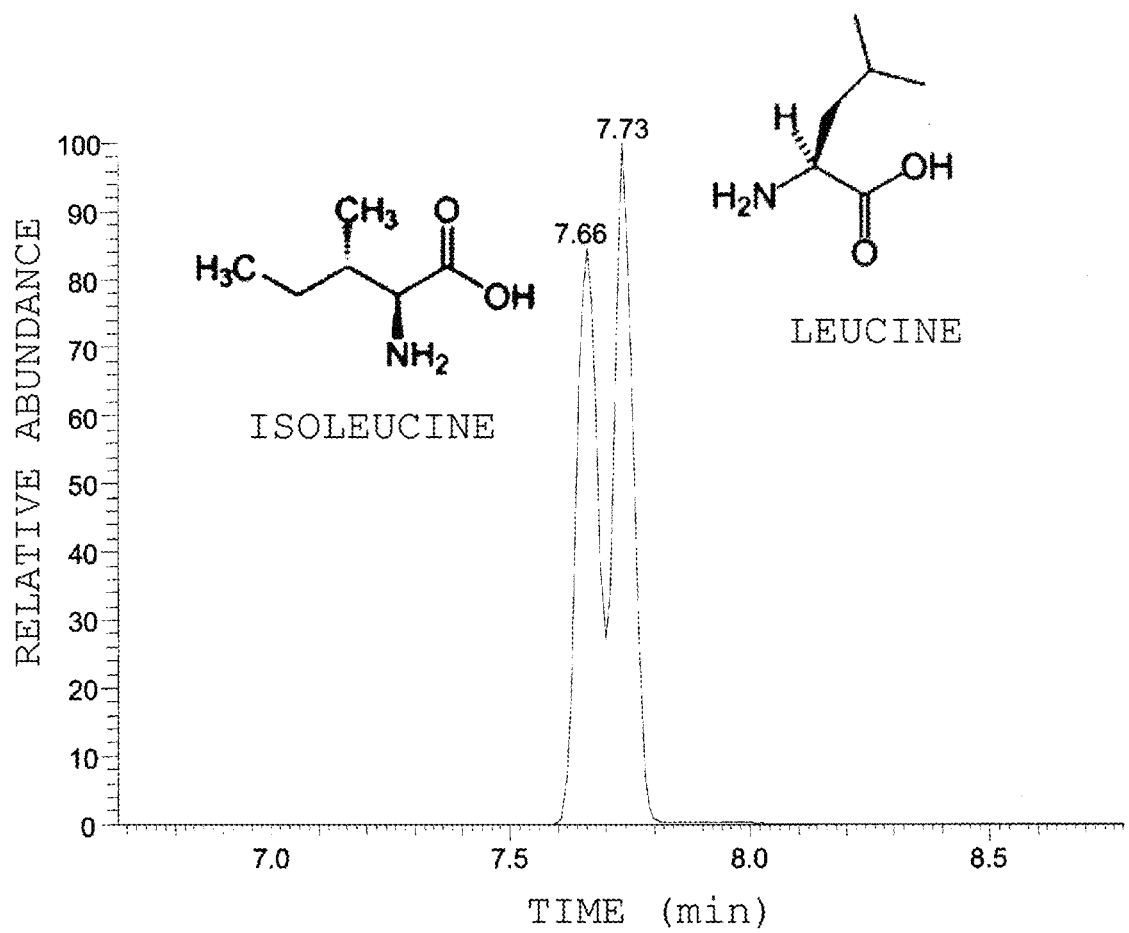
FIGS. 4A and 4B are examples of cations analyzed by the second embodiment, the former being an electropherogram of isoleucine and leucine, while the latter being a mass spectrum of isoleucine.
Figure 4B:
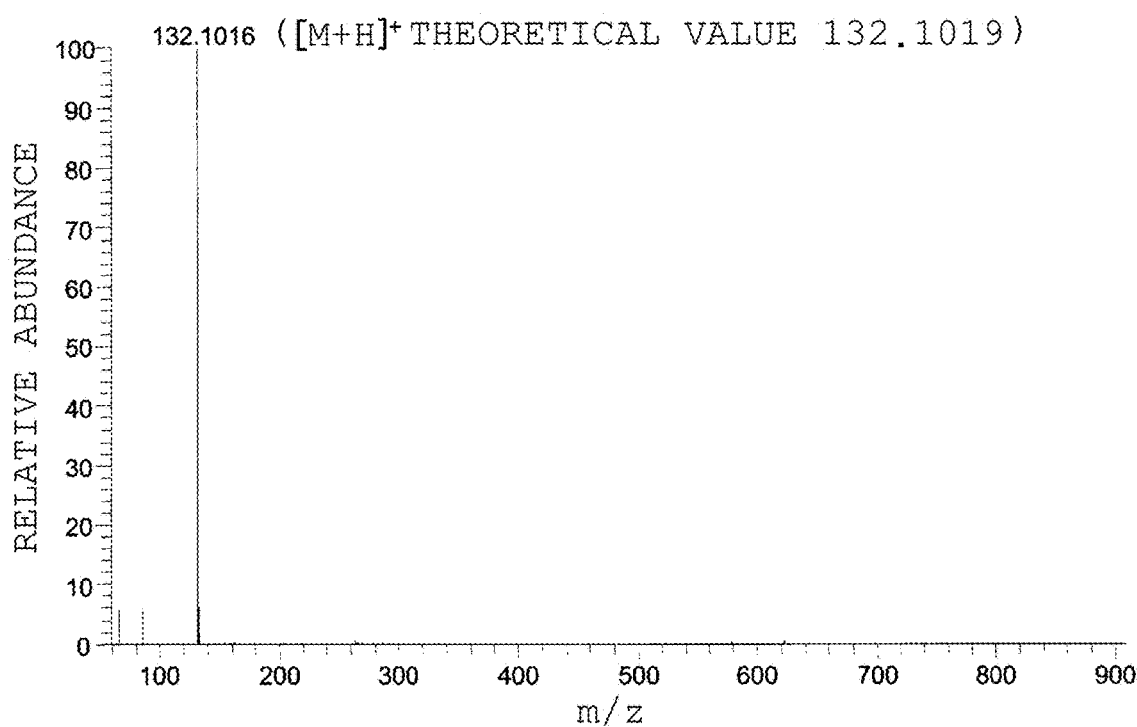

FIGS. 4A and 4B illustrate examples of cations analyzed by using the second embodiment. FIG. 4A is an electropherogram of isoleucine and leucine. FIG. 4B is a mass spectrum of isoleucine. It was confirmed that values of the cations were equal to theoretical values.

The cations were analyzed under the ion source conditions of the MS as illustrated in Table 1, under the capillary electrophoresis (CE) conditions as illustrated in Table 2, and under the ion source adapter conditions as illustrated in Table 3.

TABLE 1

MS ION SOURCE CONDITIONS

| DEVICE | Q EXACTIVE PLUS MANUFACTURED BY THERMO FISHER SCIENTIFIC |
|---|---|
| SHEATH GAS FLOW RATE | 7 L/min |
| AUXILIARY GAS FLOW RATE | 0 L/min |
| SWEEP GAS FLOW RATE | 0 L/min |
| SPRAY VOLTAGE | 0 kV |
| CAPILLARY TEMPERATURE | 50° C. |
| S LENS RF LEVEL | 70 V |

TABLE 2

CE CONDITIONS

| DEVICE | G1600A CAPILLARY ELECTROPHORESIS SYSTEM MANUFACTURED BY AGILENT TECHNOLOGIES |
|---|---|
| CAPILLARY | FUSED SILICA CAPILLARY 80 cm IN LENGTH × 50 μm IN INNER DIAMETER |
| MIGRATION SOLUTION | 1M FORMIC ACID AQUEOUS SOLUTION |
| CASSETTE TEMPERATURE | 20° C. |
| APPLIED VOLTAGE | 27 kV |
| SAMPLE INJECTION CONDITIONS | 50 mbar, 10 SECONDS |
| PUMP | KP-22 MANUFACTURED BY FLOM |
| SHEATH LIQUID FLOW RATE | 0.01 mL/min |
| SHEATH LIQUID | 50% METHANOL |

TABLE 3

ION SOURCE ADAPTER CONDITIONS

| VOLTAGE 1 | −3.5 kV |
|---|---|
| VOLTAGE 2 | −3.0 kV |
| DRY GAS FLOW RATE | 6 L/min |
| DRY GAS TEMPERATURE | 300° C. |

Figure 5A:
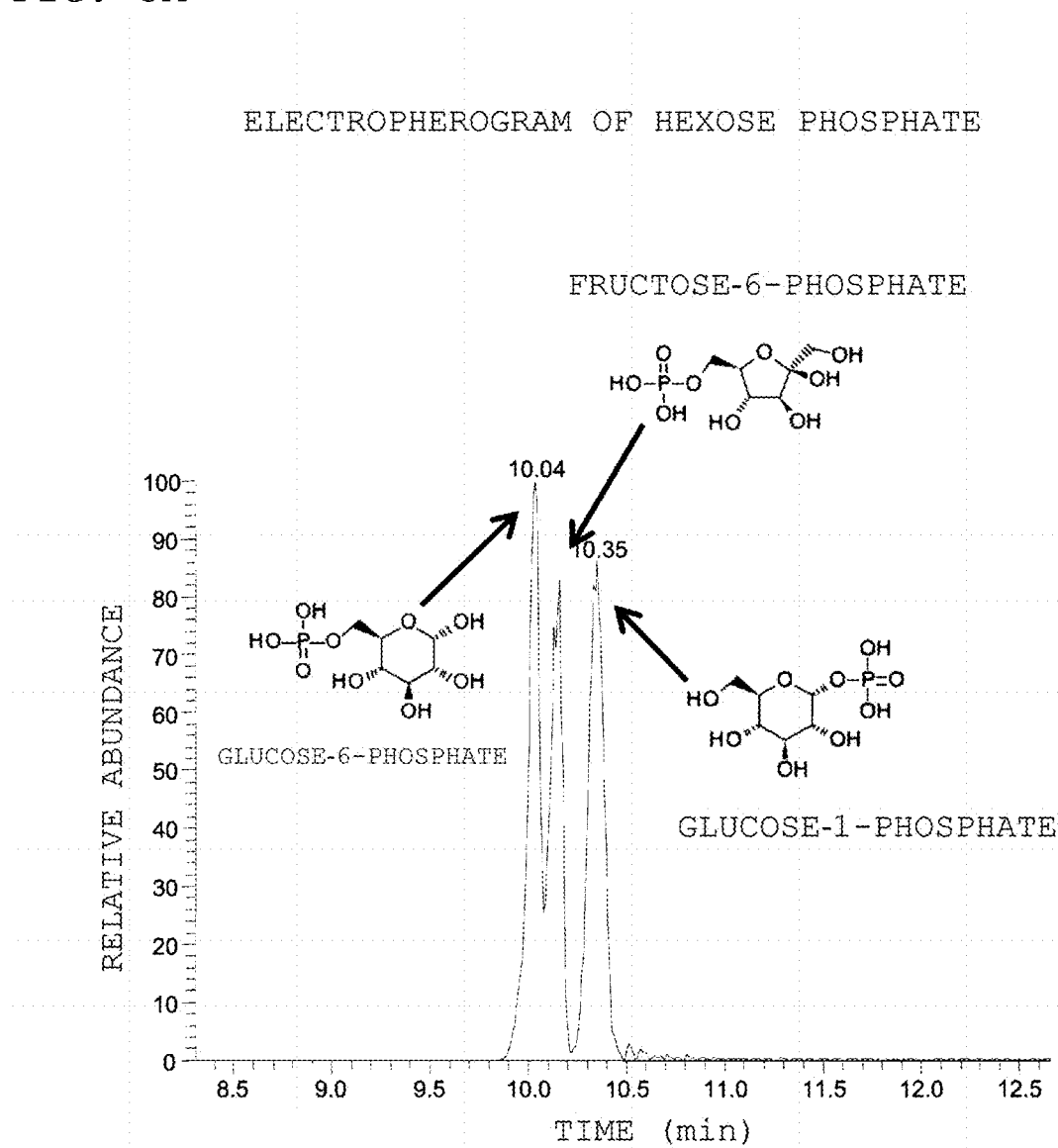
FIGS. 5A and 5B are examples of anions analyzed by the second embodiment, the former being an electropherogram of hexose phosphate, while the latter being a mass spectrum of hexose phosphate.
Figure 5B:
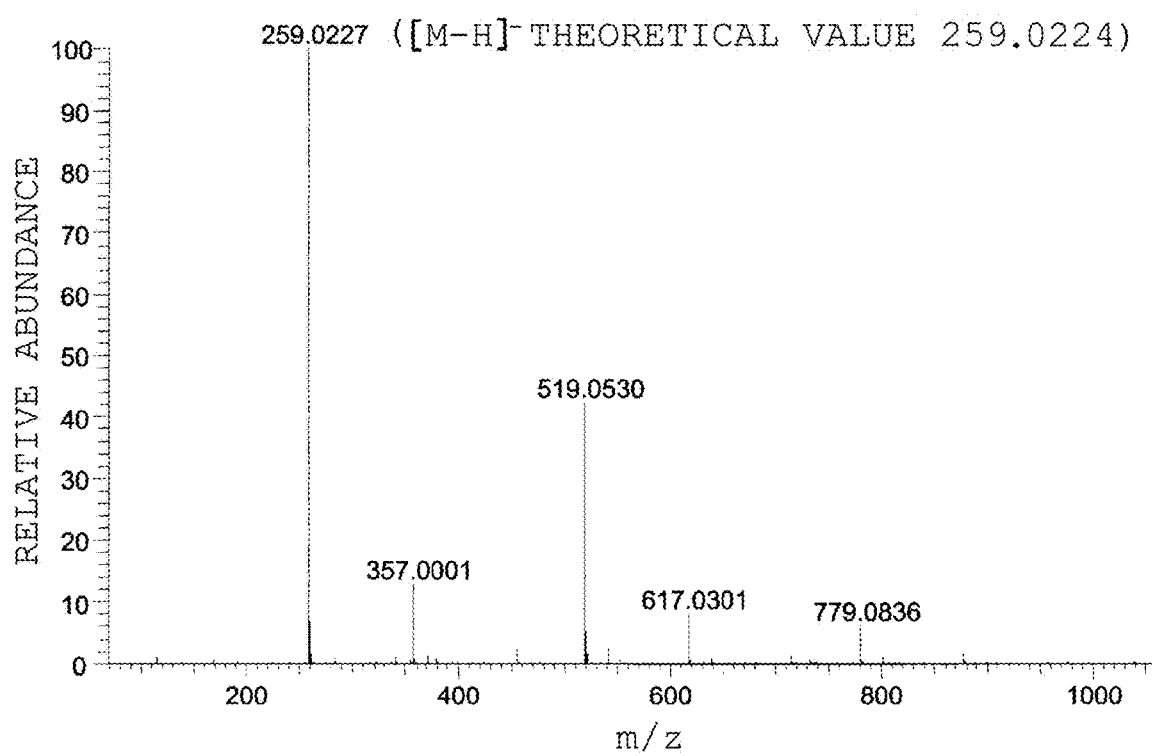

FIGS. 5A and 5B illustrate examples of anions analyzed also by using the second embodiment. FIG. 5A is an electropherogram of hexose phosphate. FIG. 5B is a mass spectrum of hexose phosphate. It was confirmed that the values of anions were also equal to theoretical values.

The anions were analyzed under the ion source conditions of the MS as illustrated in Table 4, under the CE conditions as illustrated in Table 5, and under the ion source adapter conditions as illustrated in Table 6.

TABLE 4

MS ION SOURCE CONDITIONS

| DEVICE | Q EXACTIVE PLUS MANUFACTURED BY THERMO FISHER SCIENTIFIC |
|---|---|
| SHEATH GAS FLOW RATE | 8 L/min |
| AUXILIARY GAS FLOW RATE | 0 L/min |
| SWEEP GAS FLOW RATE | 0 L/min |
| SPRAY VOLTAGE | 0 Kv |
| CAPILLARY TEMPERATURE | 100° C. |
| S LENS RF LEVEL | 90 V |

TABLE 5

CE CONDITIONS

| DEVICE | G1600A CAPILLARY ELECTROPHORESIS SYSTEM MANUFACTURED BY AGILENT TECHNOLOGIES |
|---|---|
| CAPILLARY | FUSED SILICA CAPILLARY 80 cm IN LENGTH × 50 μm IN INNER DIAMETER |
| MIGRATION SOLUTION | 50 mM AMMONIUM ACETATE AQUEOUS SOLUTION pH 8.5 |
| CASSETTE TEMPERATURE | 20° C. |
| APPLIED VOLTAGE | 30 kV |
| SAMPLE INJECTION CONDITIONS | 50 mbar, 25 SECONDS |
| PUMP | KP-22 MANUFACTURED BY FLOM |
| SHEATH LIQUID FLOW RATE | 0.01 mL/min |
| SHEATH LIQUID | 50% METHANOL |

TABLE 6

ION SOURCE ADAPTER CONDITIONS

| VOLTAGE 1 | +3.3 kV |
|---|---|
| VOLTAGE 2 | +2.9 kV |
| DRY GAS FLOW RATE | 6 L/min |
| DRY GAS TEMPERATURE | 300° C. |

Although the present invention is applied to the CE-MS device in the embodiments, the present invention may be applied to other separation analyzers. For example, the present invention is similarly applicable to combinations of other separation analyzers, such as an LC-MS device.

INDUSTRIAL APPLICABILITY

It becomes possible to enable a mass spectrometer (MS), including an electrospray ion source originally used with a voltage applied to a nebulizer side, to be used as an MS including an electrospray ion source with the nebulizer side grounded.

REFERENCE SIGNS LIST

8 . . . capillary
10 . . . ion source
12 . . . nebulizer
14 . . . metal casing
16 . . . exhaust port
18 . . . ion
20 . . . mass spectrometer (MS)
22 . . . capillary
22A . . . ion introduction port of capillary
24 . . . metal fixing tool
26 . . . O-ring
28 . . . plastic spacer
30 . . . ion source adapter
32 . . . tube
32a . . . conductive coating on outer periphery of tube 32 (on the mass spectrometer 20 side)
32b . . . conductive coating on outer periphery of tube 32 (on the nebulizer 12 side)
40 . . . fixing tool
42 . . . receiving port
48 . . . O-ring
50 . . . pressing plate
60, 62, 64, 66, 68, 70, 72 . . . electrode
80 . . . heater 82 . . . plastic support stand
84 . . . plastic spacer

The invention claimed is:

1. An ion source adapter configured to enable a mass spectrometer, used with a voltage applied to a nebulizer side of an ion source configured to generate an ion and to be used with the nebulizer side grounded, the ion source adapter comprising:
   a tube inserted between an ion introduction port of a capillary of the mass spectrometer and the nebulizer, the tube being formed of an insulator and allowing ions to pass through an interior thereof;
   a fixing tool configured to align and fix a mass spectrometer side of the tube and the ion introduction port of the capillary; and
   an electrode configured to apply a voltage to a nebulizer side of the tube, wherein:
   outer peripheries of both the nebulizer side and the mass spectrometer side of the tube are coated with conductive materials that are separated from each other, and are used for electric conduction,
   the electrode is disposed only on the nebulizer side, and
   the electrode includes a metal cap, the metal cap being connected to the electrode through the conductive materials on the outer periphery of the nebulizer side of the tube.

2. The ion source adapter according to claim 1, wherein the tube is made of a glass material, a plastic material, or a ceramic material.

3. The ion source adapter according to claim 1, comprising a heater configured to heat the nebulizer side of the tube to promote ionization.

4. A separation analysis device configured by combining separation analysis and mass analysis, the separation analysis device comprising the ion source adapter according to claim 1.

5. A separation analysis method using the separation analysis device according to claim 4.

6. The ion source adapter according to claim 1, wherein the fixing tool has a U-shaped metal receiving port at an end of the tube on the mass spectrometer side.

7. The ion source adapter according to claim 6, wherein the ion source adapter further includes an O-ring, the fixing tool including a pressing plate to fix the end of the tube on the mass spectrometer side into the receiving port through the O-ring.

8. The ion source adapter according to claim 1, wherein the electrode is disposed so as to surround at least a portion of the metal cap and the electrode is spatially separated from the metal cap.

* * * * *